(12) United States Patent
Herber et al.

(10) Patent No.: US 6,267,510 B1
(45) Date of Patent: Jul. 31, 2001

(54) ROLLER BEARING

(75) Inventors: Georg Herber; Helmut Bode, both of Herzogenaurach; Heinz Schäfers, Erlangen; Jörg Weber, Forchheim, all of (DE)

(73) Assignee: Ina Walzlager Schaeffler oHG (DE)

( * ) Notice: Subject to any disclaimer, the term of this patent is extended or adjusted under 35 U.S.C. 154(b) by 0 days.

(21) Appl. No.: 09/425,667

(22) Filed: Oct. 22, 1999

(30) Foreign Application Priority Data

Oct. 22, 1998 (DE) .............................. 198 48 705

(51) Int. Cl.⁷ .................................. F16C 33/00
(52) U.S. Cl. .................. 384/449; 384/450; 384/568; 74/55
(58) Field of Search .............. 384/58, 449, 450, 384/513, 543, 546, 549, 565, 568, 569, 586, 587; 123/90.16, 90.48; 74/55, 569

(56) References Cited

U.S. PATENT DOCUMENTS

| | | | |
|---|---|---|---|
| 2,947,581 | * 8/1960 | Van Dorn et al. .................. | 384/569 |
| 4,456,313 | * 6/1984 | Hartnett et al. ....................... | 384/565 |
| 4,802,775 | * 2/1989 | Takata ................................... | 384/450 |
| 4,877,340 | * 10/1989 | Hoeprich ............................. | 384/571 |
| 4,929,098 | * 5/1990 | Takata et al. ......................... | 384/450 |
| 5,064,298 | * 11/1991 | Hibi et al. ......................... | 384/450 X |
| 5,071,265 | * 12/1991 | Bowen et al. ....................... | 384/567 |
| 5,426,988 | * 6/1995 | Ohata et al. .............................. | 74/55 |
| 5,752,775 | * 5/1998 | Tsutsui et al. ....................... | 384/568 |

* cited by examiner

*Primary Examiner*—Thomas R. Hannon
(74) *Attorney, Agent, or Firm*—Volpe & Koenig, PC

(57) ABSTRACT

A roller bearing with roller elements constructed as rollers (4) or balls arranged between an inner race (3) and an outer race (5), and with a thick-walled outer ring (6) if provided. The inner surface of the outer ring forms the outer race (5) and the outer surface is provided for direct rolling on a cylindrical matching roller path, and has a crowned contour (7) curved in longitudinal section. In accordance with the invention, the spherical crowned contour (7) of the outer ring (6) is formed from several arcs that pass smooth into one another whereby the radius of curvature of a central arc and the radius of curvature of an outer arc have in a ratio from 2 to 1 up to 5 to 1 in relation to one another.

6 Claims, 2 Drawing Sheets

ROLLER BEARING

BACKGROUND OF THE INVENTION

The invention concerns a roller bearing with roller elements constructed as rollers or balls arranged between an inner race and an outer race and with a thick-walled outer ring whose inner surface forms the outer race and whose outer surface is provided for direct rolling on a cylindrical or flat matching roller path and has a crowned (curved in longitudinal section) contour.

Roller bearings of this type are known as castors, support rollers and cam follower which, with their thick-walled outer rings, allow the transmission of high radial stresses to their matching bearing races, mostly curved disks or straight guide paths. The convex surfaces of the outer rings are crowned in shape in order to avoid additional edge stresses from alignment errors. Such a profiling is usually determined by a constant radius. Parallel to these crowned constructions, solutions with a cylindrical outer contour are also offered, which of course attain high edge loading even with small angle errors. Owing to the high radial stress, it is advantageous with outer rings with crowned contours to have as large a radius as possible in order to reduce the minimum Hertzian stress.

From published patent German application DE 42 00 381 A1, a roller bearing is known in connection with which not an outer ring, but rather the rollers used as roller elements are preferably constructed barrel-shaped. In the end regions, the contour of each roller is determined by a curvature radius r and then passes over at a fixed point into a cylindrical shape. The roller is here in any given case constructed as a hollow roller while the roller paths of the bearing races on which the rollers move are the cylinder surfaces of an inner and an outer bearing ring.

German patent DE 29 35 023 C2 shows a roller bearing in connection with which at least some of the rollers are provided with a convex surface which, in axial section, has at least three segments with different radii of curvature passing over into one another without sharp or rounded off edges along the entire roller contour. Furthermore, the segments have radii of curvature on both sides of the middle segment which are smaller than the radii of curvature of the middle segment itself. The bearing races of this previously known bearing are not, however, cylindrical, but are likewise constructed curved.

A thick walled outer ring which would be provided for rolling on a cylindrical matching roller path cannot be inferred from these two publications.

SUMMARY OF THE INVENTION

The object of the invention is to provide a roller bearing with a thick-walled outer ring with the crowned contour of the outer ring configured such that, when rolling the outer ring on the cylindrical matching roller path, the maximum Hertzian stress arising is diminished and its threshold value is not exceeded even during tipping of the outer ring axis.

This objective is accomplished in accordance with the invention in that the crowned contour of the outer ring is comprised of several arcs which pass smoothly into one another, whereby the longer radius of curvature of a central arc and the shorter radius of curvature of an outer arc have a ratio from 2 to 1 up to 5 to 1 in relation to each other. Due to such a crowned contour, the maximum value of the Hertzian stress arising, which occurs in connection with parallel arrangement of the outer ring axis in relation to the matching roller path, is not exceeded when during rolling operation of the outer ring, its longitudinal axis inclines toward the matching roller path such that a tipping of the outer ring on the matching roller path occurs.

The crowned contour of the outer ring can be composed of three arcs, whereby the longer radius of curvature of a central arc and the short radius of curvature of an outer arc, which in any given case is adjacent to the central arc, stand in a ratio from 2 to 1 up to 5 to 1 in relation to each other. It is also possible to compose the crowned contour of the outer ring from five arcs, whereby the magnitudes of the radii of curvature of the arcs in each case diminish from the center of the outer ring axially toward the outside. Finally, the crowned contour of the outer ring can also be composed of a great number of arcs whereby the magnitudes of the radii of curvature of the arcs diminish monotonically from a greatest value in the middle of the outer ring axially toward the ends.

With such a roller bearing, the length of the radius of curvature of a central arc and the width of the outer ring can stand in a ratio from 3 to 1 up to 6 to 1 in relation to each other. It can be constructed as a support roller whereby the inner race is the outer surface of an inner ring. It is also possible, however, for the roller bearing to be constructed as a cam follower roller whereby the inner roller path is the outer surface of a bolt on its one end and its other end has a fastening thread.

BRIEF DESCRIPTION OF THE DRAWINGS

Preferred embodiments of the invention are shown in the drawing and will be described in detail below. In the drawings.

DETAILED DESCRIPTION OF THE INVENTION

Figure 1:
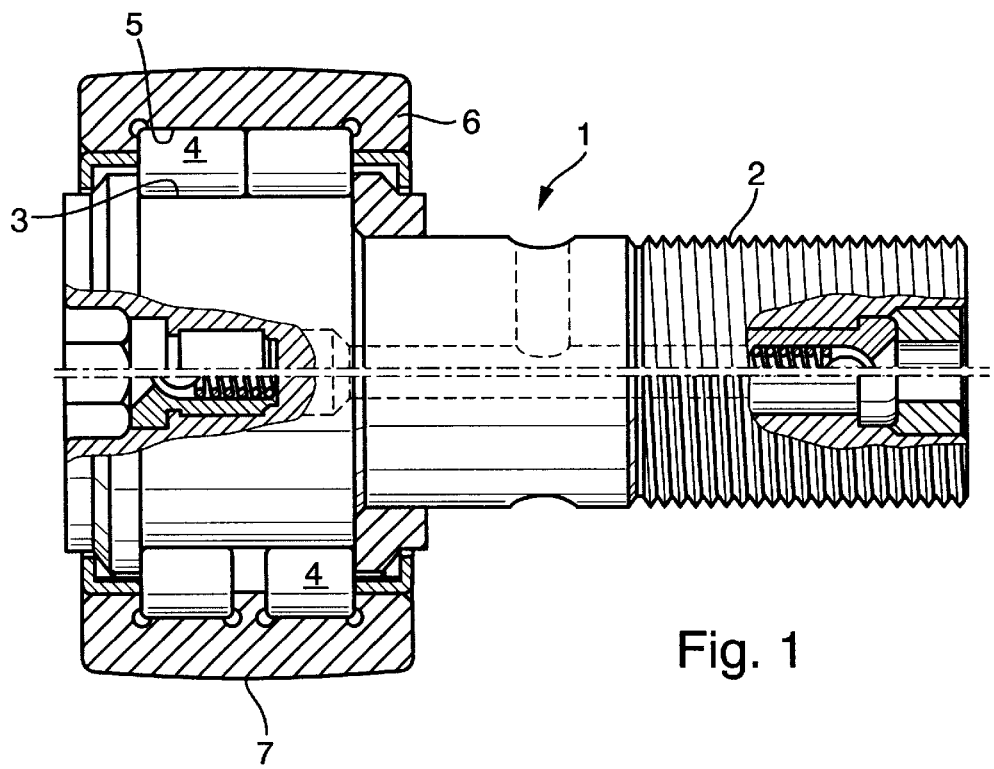
FIG. 1 shows a roller bearing of the invention constructed as a cam follower roller, partially in longitudinal section.

A roller bearing of the invention represented in FIG. 1 is constructed as a cam follower roller and contains a bolt 1 on one end of which a fastening thread 2 is formed. The other end of the bolt 1 forms a circular cylindrical inner race 3 for cylindrical rollers 4 as rolling elements of the roller bearing. Instead of the rollers 4, the use of balls is also possible. An outer race 5 is formed from the inner surface of a thick-walled outer ring 6 which surrounds the bolt 1 on its end which includes the inner race and the rollers 4. In FIG. 1, two different possibilities for constructing and arranging the rollers are represented. In the upper half, longer rollers 4 are shown which are directly adjacent to each other, while in the lower half, shorter rollers 4 are arranged axially spaced apart from each other. Thus, a cam follower roller with longer rollers 4 as well as a cam follower roller with short rollers 4 or with balls is conceivable.

In accordance with the invention, the outer ring has a convex surface which appears as a crowned contour in cross section which is comprised by several arcs. Furthermore, the adjacent arcs pass smoothly into each other, thus having a common tangent on their adjacent ends. In the embodiment according to FIGS. 1 to 5, on the outer ring 6, the crowned contour 7 is formed from a central arc with a longer radius of curvature $K_1$ and two adjacent arcs with a shorter radius of curvature $K_2$. The radius of curvature $K_1$ stands in a ratio from 2 to 1 up to 5 to 1 with each radius of curvature $K_2$. The length of the radius of curvature $K_1$ and the width B of the outer ring 6 are preferably in a ratio from 3 to 1 up to 6 to 1 in relation to each other.

Figure 2:
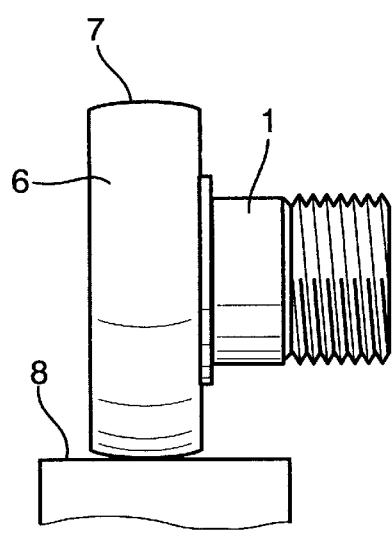
FIG. 2 illustrates the guide roller moving on a cylindrical matching roller path with the long axis parallel to the matching roller path.
Figure 3:
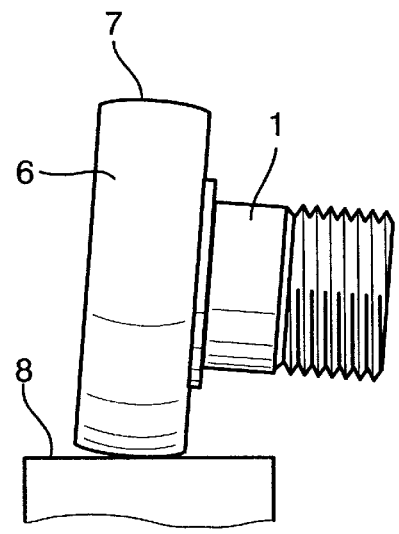
FIG. 3 depicts the guide roller in accordance with FIG. 2 with the long axis inclined (tipped) in relation to the matching roller path.
Figure 4:
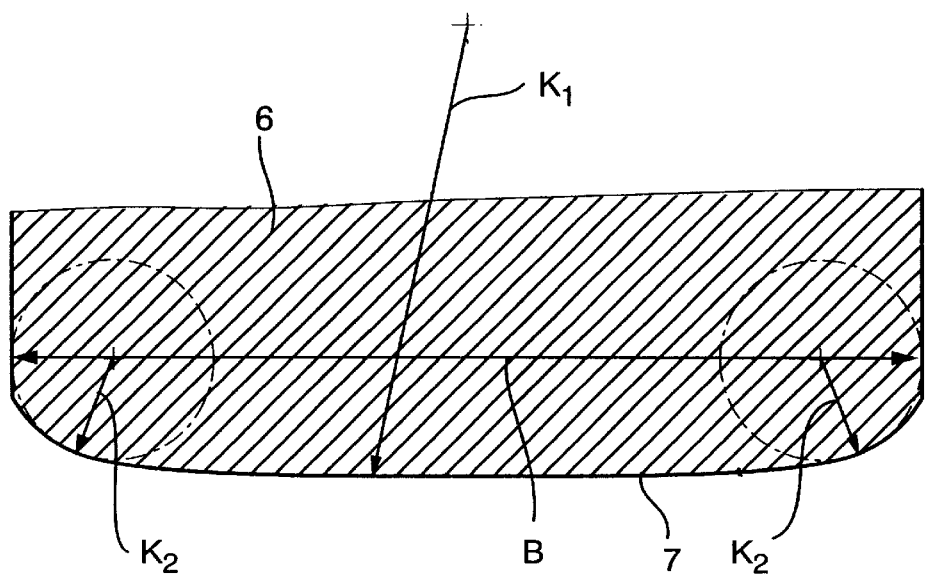
FIG. 4 represents a longitudinal section through an outer ring of a guide roller with a contour composed of three arcs.

In FIGS. 2 and 3, two different attitudes of the outer ring 6 of the bolt 1 in relation to a matching roller path 8 are represented on which the outer ring 6 with its crowned contour 7 moves. The matching roller path 8 can be a cylindrical or flat surface. In FIG. 2, the axis of rotation of the outer ring 6 runs parallel to the matching roller path 8, while the axis in FIG. 3 is arranged inclined in relation to matching roller path 8. The outer ring is here thus arranged tipped with reference to the matching roller path 8.

Figure 6:
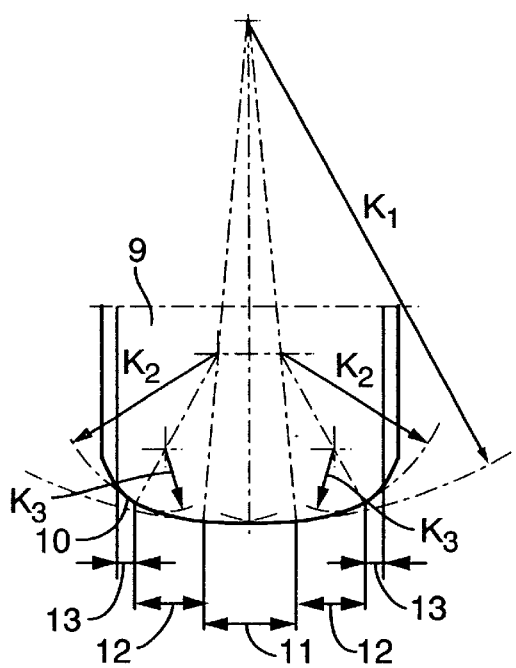
FIG. 6 illustrates an outer ring modified in comparison to FIG. 5 with representation of the areas of five arcs of which the contour of the outer ring is composed.

The outer ring 9 in accordance with FIG. 6 has a crowned contour 10 which is comprised by a total of five arcs. In any given case these follow from the center of the outer ring 9 to one end in the axial direction from an arc with the greatest radius of curvature $K_1$, to an arc with a smaller radius of curvature $K_2$, and from this to an arc with an even smaller radius of curvature $K_3$. The magnitudes of the radii of curvature $K_1$, $K_2$ and $K_3$ thus diminish monotonically from a greatest value in the center to the ends.

Figure 5:
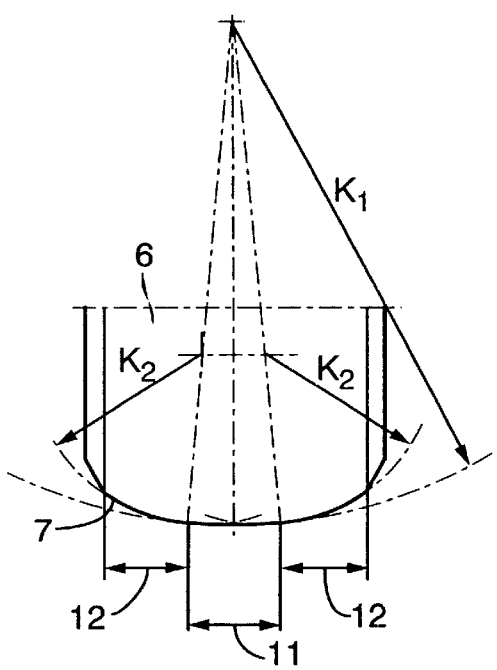
FIG. 5 shows an outer ring corresponding to FIG. 4 with representation of the areas of the three arcs.

In FIG. 5, two areas 12 of arcs with smaller radii of curvature $K_2$ are connected with an area 11 of the arc with the greatest curvature radius $K_1$. With the outer ring 9 represented in FIG. 6, further additional areas 13 of arcs with the smallest radii of curvature $K_3$ follow in axial direction upon the corresponding areas 11 and 12.

Experiments have shown that with outer rings with curved contours formed by several arcs in accordance with the invention, the Hertzian stress arising in interaction with the matching roller path 8 is clearly diminished, and its threshold value is not exceeded even when the outer ring axis is tipped.

REFERENCE NUMBER LIST

1. Bolts
2. Fastening thread
3. Inner race
4. Roller
5. Outer race
6. Outer ring
7. Crowned contour
8. Matching roller path
9. Outer ring
10. Spherical contour
11. Area of the arc with the greatest radius of curvature
12. Area of the curve with the smaller radius of curvature
13. Area of the curve with the smallest radius of curvature
$K_1$ Radius of curvature
$K_2$ Radius of curvature
$K_3$ Radius of curvature
B Width of the outer ring

What is claimed is:

1. Roller bearing comprising roller elements constructed as one of rollers (4) and balls arranged between an inner race (3) and an outer race (5), and having a thick-walled outer ring (6, 9) having an inner surface which forms the outer race (5) and an outer surface which is provided for direct rolling on a cylindrical or flat matching roller path (8) and which has a crowned contour (7, 10) curved in longitudinal section, the crowned contour (7, 10) of the outer ring (6, 9) is composed of several arcs, the arcs pass smoothly into each other, a central arc having a longer radius of curvature ($K_1$) and an outer arc having a shorter radius of curvature ($K_2$, $K_3$) which are in a ratio of from 2 to 1 up to 5 to 1 in relation to each other.

2. Roller bearing according to claim 1, wherein the crowned contour (7) of the outer ring (6) is composed of three arcs, the longer radius of curvature ($K_1$) of the central arc and the radius of curvature ($K_2$) of the outer arcs, which are adjacent to the central arc, have a ratio from 2 to 1 up to 5 to 1 in relation to each other.

3. Roller bearing according to claim 1, wherein the crowned contour (10) of the outer ring (9) is composed of five arcs, the radii of curvature ($K_1$, $K_2$, $K_3$) of the arcs diminish radially from a center of the outer ring (9) outwardly.

4. Roller bearing according to claim 1, wherein the crowned contour of the outer ring is comprised by at least five arcs, the radii of curvature of the arcs diminish monotonically from a greatest value in a center of the outer ring (9) axially toward both ends of the outer ring.

5. Roller bearings according to claim 1, wherein the outer ring has a width and the length of the radius of curvature ($K_1$) of the central arc and the width (B) of the outer ring (6, 9) have a ratio from 3 to 1 up to 6 to 1 in relation to each other.

6. Roller bearing according to claim 1, wherein the roller bearing is constructed as a cam follower and the inner race (3) is formed on an outer surface of a bolt (1) on one axial end of the bolt and the other axial end of the bolt has a fastening thread (2).

\* \* \* \* \*